US010016883B1

(12) United States Patent
Heaton

(10) Patent No.: US 10,016,883 B1
(45) Date of Patent: Jul. 10, 2018

(54) SINK DRAIN FITTING RING INSTALLATION TOOL

(71) Applicant: Kenneth Guy Heaton, Orange, CA (US)

(72) Inventor: Kenneth Guy Heaton, Orange, CA (US)

( * ) Notice: Subject to any disclaimer, the term of this patent is extended or adjusted under 35 U.S.C. 154(b) by 0 days.

(21) Appl. No.: 15/874,867

(22) Filed: Jan. 18, 2018

Related U.S. Application Data

(63) Continuation-in-part of application No. 15/725,272, filed on Oct. 4, 2017, which is a continuation-in-part of application No. 14/121,460, filed on Sep. 9, 2014, now abandoned, which is a continuation-in-part of application No. 12/925,965, filed on Nov. 3, 2010, now Pat. No. 8,858,135, which is a continuation of application No. 12/069,047, filed on Feb. 7, 2008, now Pat. No. 7,921,532.

(51) Int. Cl.
*B23P 11/00* (2006.01)
*B25B 27/20* (2006.01)

(52) U.S. Cl.
CPC ............. *B25B 27/20* (2013.01); *Y10T 29/539* (2015.01); *Y10T 29/53843* (2015.01); *Y10T 29/53909* (2015.01); *Y10T 29/53943* (2015.01); *Y10T 29/53978* (2015.01)

(58) Field of Classification Search
CPC ........... B23P 19/00; B23P 19/12; B23P 25/00; B23Q 1/03; B23Q 1/70; B66F 1/00; B66F 11/00
See application file for complete search history.

(56) References Cited

U.S. PATENT DOCUMENTS 5,584,110 A * 12/1996 Mordoch ............ B25B 27/0028 29/225
7,685,689 B1 * 3/2010 Del Castello ......... E03C 1/2665 254/133 R
7,921,532 B2 * 4/2011 Heaton ................... B25B 27/20 29/255
8,858,135 B2 * 10/2014 Heaton .................. B26D 3/163 30/103
9,827,657 B1 * 11/2017 Nelson .................... B25B 27/16
2009/0199382 A1 * 8/2009 Heaton ................... B25B 27/20 29/270
2012/0103162 A1 * 5/2012 Heaton .................. B26D 3/163 83/821
2016/0067875 A1 * 3/2016 Heaton .................. B26D 3/163 409/179

* cited by examiner

*Primary Examiner* — Lee D Wilson
(74) *Attorney, Agent, or Firm* — Quickpatents, LLC; Kevin Prince

(57) ABSTRACT

A tool for installing a retainer ring onto the lower portion of a loosely inserted drain fitting for engaging a mounting flange thereto includes a generally resilient tubular segment provided with a plurality of axially aligned and resiliently cantilevered peripherally adjacent strips within which the retaining ring is received in a compressed engagement seated on a shoulder of each strip. A threaded shaft extends through a bottom plate of the segment received in the drain fitting and then through the cup interior to axially advance the axially aligned ring carried by the strips. A platform for both supporting the threaded shaft within the drain fitting and for supporting a garbage disposal on a base is included.

9 Claims, 4 Drawing Sheets

SINK DRAIN FITTING RING INSTALLATION TOOL

CROSS-REFERENCE TO RELATED APPLICATIONS

This application is a continuation-in-part of U.S. patent application Ser. No. 15/725,272, filed on Oct. 4, 2017, which is itself a continuation-in-part of U.S. patent application Ser. No. 14/121,460, filed Sep. 9, 2014, which, in turn is a continuation-in-part of U.S. patent application Ser. No. 12/925,965, filed Nov. 3, 2010, now issued as U.S. Pat. No. 8,858,135, which is itself a continuation of Ser. No. 12/069,047 filed on Feb. 7, 2008, now issued as U.S. Pat. No. 7,921,532, the benefit of these earlier filing dates is claimed for all matter common therewith.

STATEMENT REGARDING FEDERALLY SPONSORED RESEARCH AND DEVELOPMENT

Not Applicable.

FIELD OF THE INVENTION

The present invention relates to retainer ring installation tools, and more particularly to an installation tool for mounting a retainer ring into an annular groove formed around the exterior of the lower periphery of a sink drain fitting conformed to engage a food refuse disposal device.

DISCUSSION OF RELATED ART

The process of replacement and mounting a food refuse macerator, sometimes referred to as a garbage disposal, to the lower drain portions of a kitchen sink entails complex engagement geometries that need to be affected within the very tight and narrow confines of a sink cabinet and is therefore a difficult and cumbersome task. Simply, the disposal is usually a fairly heavy item as it typically requires a robust electrical motor tied to various gearing components, all housed in a sealed enclosure to extend a drive end engaged to the cutting mechanism into a wet cavity that communicates with the sink drain. To simplify the mounting process of this cumbersome equipment, the sink drain fittings that are intended to support the disposal are typically provided with a lower end that includes an exterior ring groove in which a retainer ring is mounted to support a disposal mounting flange. It is this mounting flange that then includes the typical engagement projections to which the disposal is keyed.

While the currently available disposals that are offered by the several fabricators are typically quite rugged their repeated household use takes its toll nonetheless and the replacement thereof is now a fairly frequent event. Since this eventual replacement is often preceded by fairly long periods of use of a disposal that is operated with some damage the drain fitting itself is often also damaged by repeated periods of asymmetric or unbalanced loads. Good practice therefore requires that the fitting be replaced along with the disposal. Any tool complement that is useful in assisting the disposal installation task should therefore also include the tools for the drain fitting replacement and, in particular, the attachment of the mounting flange thereon.

In the past I have described in U.S. Pat. Nos. 7,024,743, 7,140,086 and 7,921,532 adjustable supporting mechanisms on which heavy items like a disposal can be lifted to mate up with the mounting flange, a mechanism that is particularly conformed to the tight dimensions below a sink. By virtue of its adjustment facility this mechanism allows for convenient attachment of the disposal throat to the mounting flange by a single worker. Others, in turn, have devised various forms of hand tools which in one way or another assist in the installation of retaining rings into the ring grooves formed in the lower parts of a sink drain to secure the mounting flange thereon exemplified by the teachings of U.S. Pat. No. 7,185,408 to Keith; U.S. Pat. No. 5,177,853 to Herook; U.S. Pat. No. 4,411,054 to Zeilenga; and US patent application publications 2003/0192162 and 2002/0138963 both by Ramirez.

While the foregoing, and the other, prior art installation tools may be suitable for the purposes intended, it will be appreciated that it is when the sink drain fitting is loose and unsecured in its drain placement that the ring installation is being attempted. Simply, all the ring installation manipulations are in the tight confines of the cabinet below the sink bowl into which the lower part of the drain fitting with the ring groove thereon extends and since the retainer ring is there to secure the mounting flange that also is used to fix the drain fitting to the sink bowl of necessity either two workers are needed, one to hold the fitting to the sink while the other tries to fit the ring from below, or some other mechanism is required to hold the drain fitting while the ring is mounted.

In those prior art instances where an alignment structure is provided for the ring installation process, as in the teachings of the '408, '853 and '054 patents above, the alignment is referenced to the drain fitting that is then loosely hanging in the sink drain. Alternatively, where there is no referencing structure for the ring expansion tool, as in the Ramirez published applications above, the worker needs to insert both his or her arms into the tight confines below the sink, one arm to hold the lower drain fitting portion while mounting the ring with the other hand. Of course, these tight working conditions preclude any effective control over the drain fitting alignment within the drain opening, disturbing often the sealant bed that is laid around the drain opening and therefore inviting the chances of eventual leakage.

In my previous '532 patent I overcame these obstacles, but the threaded screw 31 and plug 32 were somewhat cumbersome to use and had no additional uses in the process. As a result, additional tools such as a garbage disposal support stand was required to be carried along with the other tools needed to complete a garbage disposal replacement or installation. Accordingly, in addition to the need for a fixed, base mounted alignment tool that is useful within the narrow confines below a sink to guide the movements of the retainer ring installation, together with an adaptive ring holder structure that is easily controlled by one hand, there is a need for a new set of tools that has a minimum of components, many of which can be used in different modes during the garbage disposal replacement or installation process. The present invention accomplishes these objectives.

SUMMARY OF THE INVENTION

The present device is an alignment tool for aligning a split retainer ring for receipt in an exterior ring groove formed around the exterior of a lower peripheral of a sink drain fitting. Such a sink drain fitting is installed in a sink typically with a garbage disposal attached to the sink drain fitting.

A generally tubular segment defined by a peripheral wall encloses an interior opening dimensioned to radially compress the retainer ring upon the generally transverse receipt thereof within the opening. A first portion of the peripheral wall includes a plurality of spaced separations extending generally parallel to the central axis of the segment and defining a corresponding plurality of partial wall strips extending in cantilever from the remaining second portion thereof to top ends thereof. A support shoulder is formed in interior surfaces of each strip at the top ends thereof for opposing the axial translation of the ring within the interior opening.

In use, with the split ring fixed within the opening at the top ends of the strips at the support shoulders thereof, the split ring is pressed about the lower peripheral of the sink drain fitting. Each strip flexes outwardly as the split ring expands around the lower peripheral of the sink drain fitting until it snaps into the ring groove of the sink drain fitting.

In some preferred embodiments a bottom plate extends across the second portion of the tubular segment at a bottom end thereof. The bottom plate includes a central threaded aperture therethrough. A threaded shaft extends through the aperture of the bottom plate, through the segment, and is configured to extend into the drain fitting. The threaded shaft includes a first end and an opposing second end.

The threaded shaft, in some embodiments, further includes a mount platform conformed for receiving the first end of the threaded shaft. The mount platform is dimensions so as to not be able to pass through the drain fitting. Preferably in some embodiments the second portion includes a plurality of handle grip extensions extending radially outwardly from the segment for facilitating rotation of the segment on the threaded shaft manually.

In such embodiments the platform is positioned in the sink above the sink drain fitting and attached to the first end of the threaded shaft. The action of forcing the split ring over the lower peripheral of the sink drain fitting with the tubular segment pulls the threaded shaft and mount platform downwardly until it is stopped by the sink, providing support to the tubular segment to expand the retainer ring over the lower peripheral of the sink drain fitting and into the exterior ring groove.

Some embodiments further include a garbage disposal stand having a base adapted for resting on a support surface, such as a cabinet floor, below the sink fitting and an associated sink. The mount platform has a substantially flat top side. A manually-actuable knob engages the second end of the threaded shaft to raise or lower the shaft and mount platform with respect to the base. As such, the stand can be positioned below a garbage disposal with the mount platform raised to support the garbage disposal on the flat top side thereof in place at the sink drain fitting. Such a stand allows the threaded shaft and mount platform to be used in different modes during a replacement of the garbage disposal and provides for a minimum number of tools required for such a job.

The present invention provides a fixed, base mounted alignment tool that is useful within the narrow confines below a sink to guide the movements of the retainer ring installation, together with an adaptive ring holder structure that is easily controlled by one hand. The present invention provides a minimum of components, several of which are used in different modes during the garbage disposal replacement or installation process. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
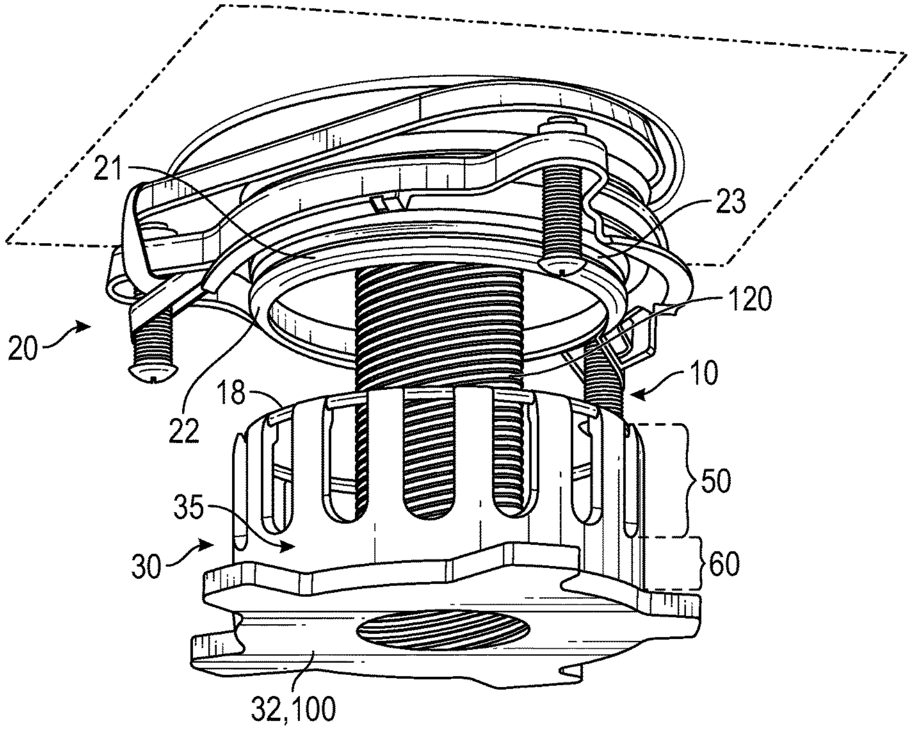
FIG. 1 is a bottom perspective view of the invention as configured for use on a sink drain fitting.
Figure 2:
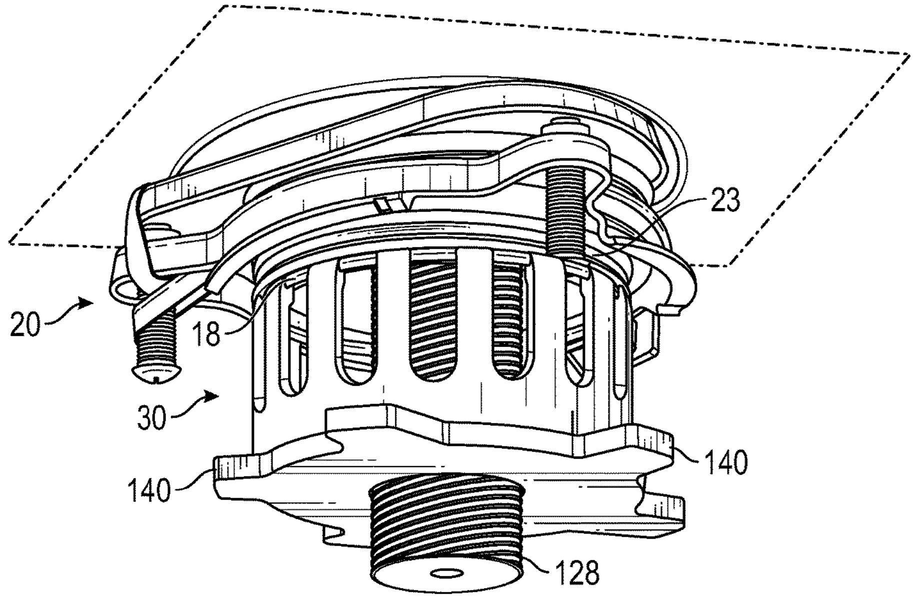
FIG. 2 is a bottom perspective view thereof, illustrated with a tubular segment fitted with a split retainer ring as engaging the sink drain fitting.
Figure 3:
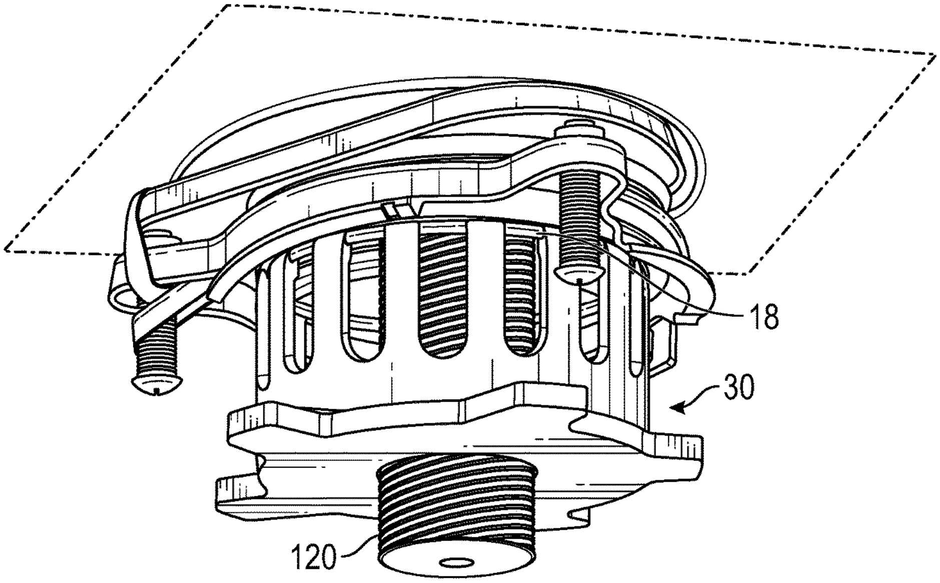
FIG. 3 is a bottom perspective view thereof, illustrated with the split retainer ring fitted into an exterior ring groove of the sink drain fitting.
Figure 4:
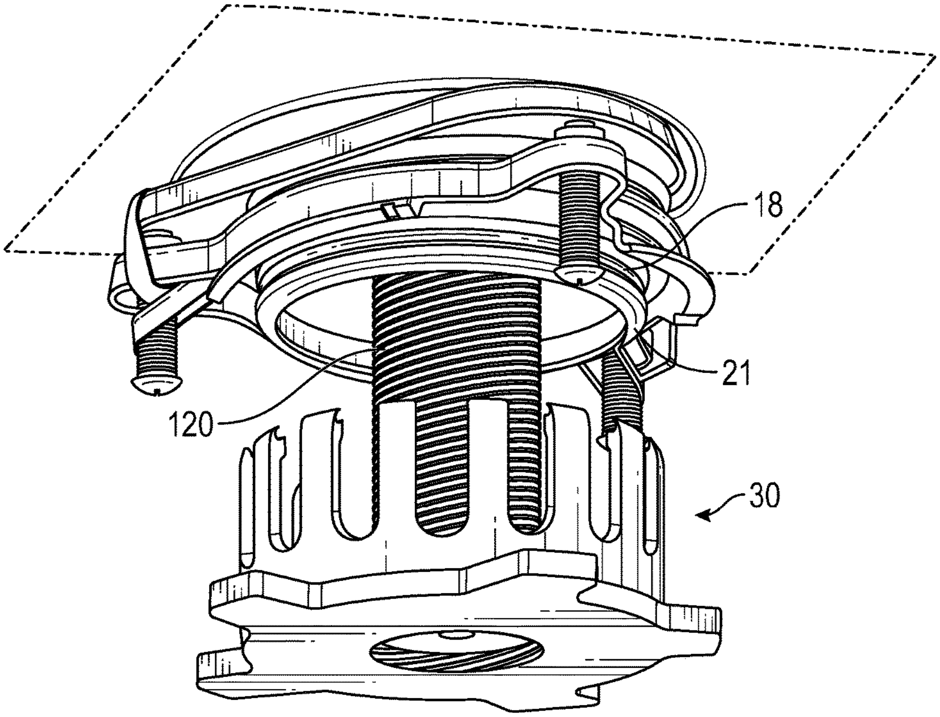
FIG. 4 is a bottom perspective view thereof, illustrated with the tubular segment being removed from a threaded shaft.
Figure 5:
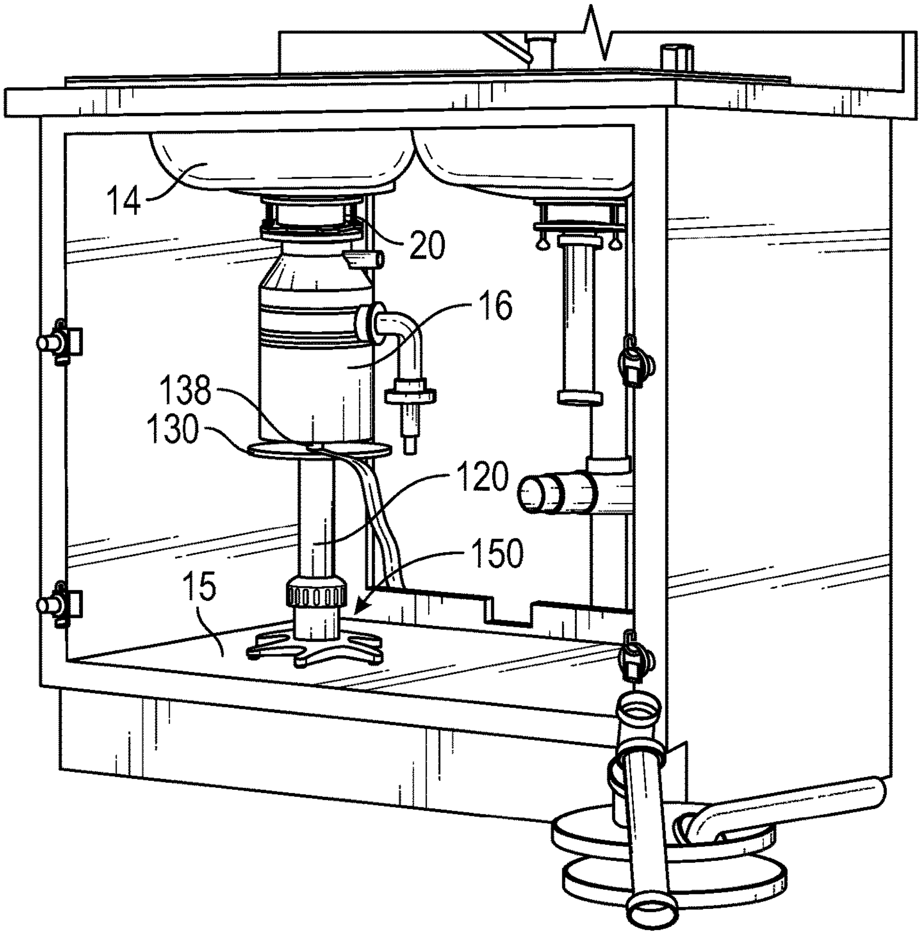
FIG. 5 is a perspective view of the invention as used with a sink within a cabinet to install a garbage disposal.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate an alignment tool 10 for aligning a split retainer ring 18 for receipt in an exterior ring groove 23 formed around the exterior 21 of a lower peripheral 22 of a sink drain fitting 20. Such a sink drain fitting 20 is installed in a sink 14 typically with a garbage disposal 16 attached to the sink drain fitting 20.

A generally tubular segment 30 defined by a peripheral wall 35 encloses an interior opening 40 dimensioned to radially compress the retainer ring 18 upon the generally transverse receipt thereof within the opening 40. A first portion 50 of the peripheral wall 35 includes a plurality of spaced separations 70 extending generally parallel to the central axis of the segment 30 and defining a corresponding plurality of partial wall strips 80 extending in cantilever from the remaining second portion 60 thereof to top ends 38 thereof. The segment 30 is preferably made from a resilient plastic material. A support shoulder 90 is formed in interior surfaces 41 of each strip 80 at the top ends 38 thereof for opposing the axial translation of the ring 18 within the interior opening 40.

In use, with the split ring 18 fixed within the opening 40 at the top ends 38 of the strips 80 at the support shoulders 90 thereof, the split ring 18 is pressed about the lower peripheral 22 of the sink drain fitting 20. Each strip 80 flexes outwardly as the split ring 18 expands around the lower peripheral 22 of the sink drain fitting 20 until it snaps into the ring groove 23 of the sink drain fitting 20.

In some embodiments a bottom plate 100 extends across the second portion 60 of the tubular segment 30 at a bottom end 32 thereof. The bottom plate 100 includes a central threaded aperture 110 therethrough. A threaded shaft 120 extends through the aperture 110 of the bottom plate 100, through the segment 30, and is configured to extend into the drain fitting 20. The threaded shaft 120 includes a first end 122 and an opposing second end 128. Preferably the threaded shaft 120 includes a thread with at least six starts and is made from a plastic injection molded or milled material.

The threaded shaft 120, in some embodiments, further includes a generally disk-shaped mount platform 130 conformed for receiving the first end 122 of the threaded shaft 120. The mount platform 130 is dimensions so as to not be able to pass through the drain fitting 20. Preferably in some embodiments the second portion 60 includes a plurality of handle grip extensions 140 extending radially outwardly from the segment 30 for facilitating rotation of the segment 30 on the threaded shaft 120 manually.

In such embodiments the platform 130 is positioned in the sink 14 above the sink drain fitting 20 and attached to the first end 122 of the threaded shaft 120. The action of forcing the split ring 18 over the lower peripheral 22 of the sink drain fitting 20 with the tubular segment 30 pulls the threaded shaft 120 and mount platform 130 downwardly until it is stopped by the sink 14, providing support to the tubular segment 30 to expand the retainer ring 18 over the lower peripheral 22 of the sink drain fitting 20 and into the exterior ring groove 23.

Figure 6:
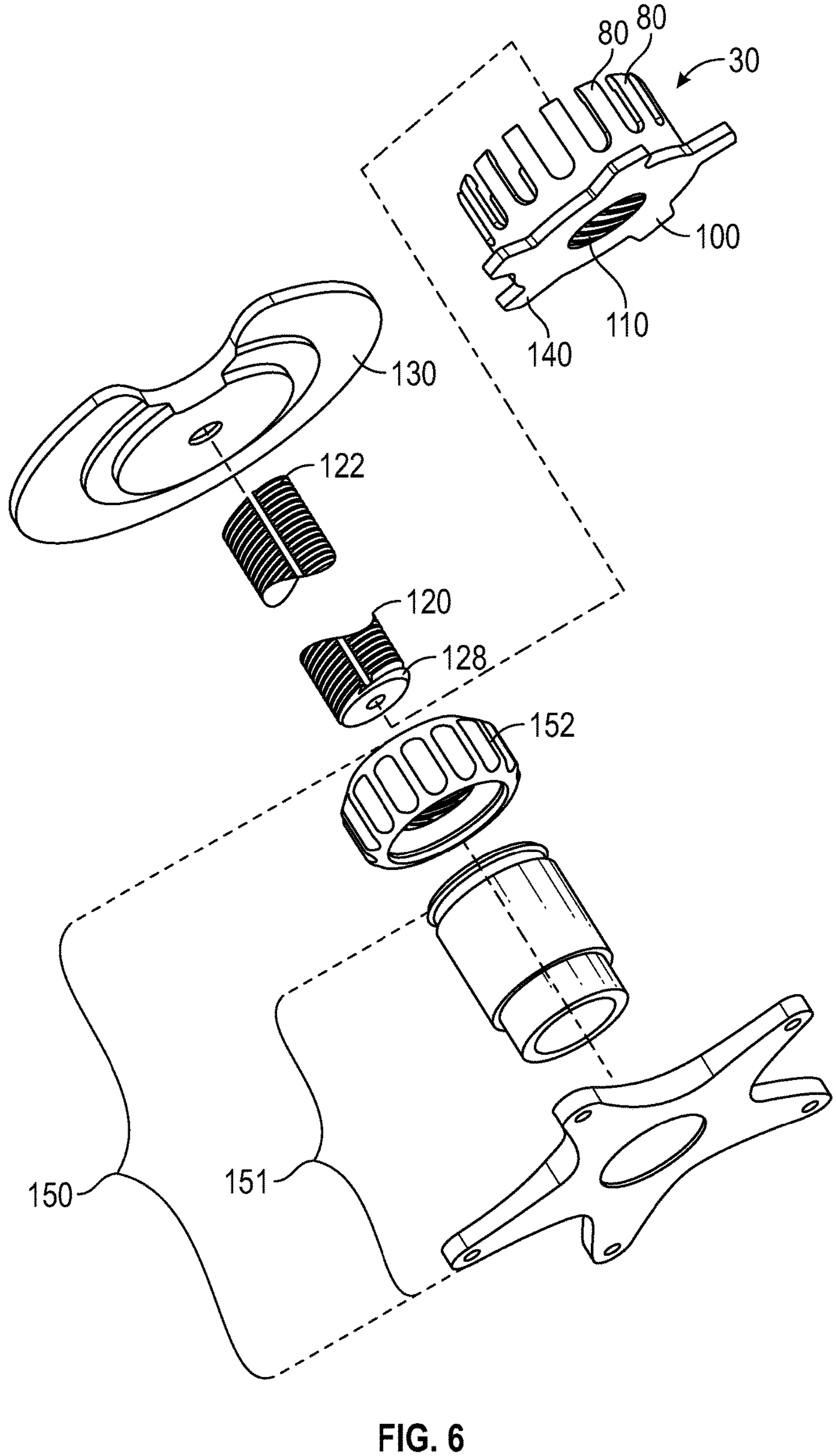
FIG. 6 is a perspective exploded view of the invention.

Some embodiments further include a garbage disposal stand 150 (FIGS. 5 and 6) having a base 151 adapted for resting on a support surface 15, such as a cabinet floor, below the sink fitting 20 and the associated sink 14. The mount platform 130 has a substantially flat top side 138. A manually-actuable knob 152 engages the second end 128 of the threaded shaft 120 to raise or lower the shaft 120 and mount platform 130 with respect to the base 151. As such, the stand 150 can be positioned below the garbage disposal 16 with the mount platform 130 raised to support the garbage disposal 16 on the flat top side 138 thereof in place at the sink drain fitting 20. Such a stand 150 allows the threaded shaft 120 and mount platform 130 to be used in different modes during a replacement of the garbage disposal 14 and provides for a minimum number of tools required for such a job. The stand 150 can be made from a rigid or semi-rigid plastic material, wood, or metal.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An alignment tool for aligning a split retainer ring for receipt in an exterior ring groove formed around the exterior of a lower peripheral of a sink drain fitting, comprising:

a generally tubular segment defined by a peripheral wall enclosing an interior opening dimensioned to radially compress the retainer ring upon the generally transverse receipt thereof within the opening, a first portion of the peripheral wall including a plurality of spaced separations extending generally parallel to the central axis of the segment defining a corresponding plurality of partial wall strips extending in cantilever from the remaining second portion thereof to top ends thereof;

a support shoulder formed in interior surfaces of each strip at the top ends thereof for opposing the axial translation of the ring within the interior opening;

a bottom plate extending across the second portion of the tubular segment at a bottom end thereof, the bottom plate including a central threaded aperture therethrough;

a threaded shaft extending through the aperture of the bottom plate, through the segment, and configured to extend into the drain fitting, the threaded shaft having a first end, an opposing second end, and a thread with at least six starts;

whereby with the split ring fixed within the opening at the top ends of the strips at the support shoulders thereof, the split ring is pressed about the lower peripheral of the sink drain fitting, flexing each strip outwardly as the split ring expands around the lower peripheral of the sink drain fitting until it snaps into the ring groove of the sink drain fitting.

2. The alignment tool of claim 1 wherein the threaded shaft further includes a mount platform conformed for receiving the first end of the threaded shaft, the mount platform dimensioned with a diameter larger than that of the drain fitting;

whereby the segment is threaded onto the second end of the threaded shaft and rotated along the threaded shaft to raise or lower the segment towards or away from the drain fitting.

3. The alignment tool of claim 2 wherein the second portion includes a plurality of handle grip extensions extending radially outwardly from the segment for facilitating rotation of the segment on the threaded shaft.

4. The alignment tool of claim 2 further including a garbage disposal stand having a base adapted for resting on a support surface below the sink fitting and a manually-actuable knob, the mount platform having a substantially flat top side, the manually-actuable knob engaging the second end of the threaded shaft to raise or lower the shaft and mount platform with respect to the base, whereby the stand can be positioned below a garbage disposal, the mount platform raised to support the garbage disposal on the flat top side thereof in place at the sink drain fitting.

5. An alignment tool for aligning a split retainer ring for receipt in an exterior ring groove formed around the exterior of a lower peripheral of a sink drain fitting, comprising:

a generally tubular segment defined by a peripheral wall enclosing an interior opening dimensioned to radially compress the retainer ring upon the generally transverse receipt thereof within the opening, a first portion of the peripheral wall including a plurality of spaced separations extending generally parallel to the central axis of the segment defining a corresponding plurality of partial wall strips extending in cantilever from the remaining second portion thereof to top ends thereof; and a support shoulder formed in interior surfaces of each strip at the top ends thereof for opposing the axial translation of the ring within the interior opening;

a bottom plate extending across the second portion of the tubular segment at a bottom end thereof, the bottom plate including a central threaded aperture therethrough;

a threaded shaft extending through the aperture of the bottom plate, through the segment, and configured to extend into the drain fitting, the threaded shaft having a first end and an opposing second end; and a mount platform conformed for receiving the first end of the threaded shaft, the mount platform dimensioned with a diameter larger than that of the drain fitting;

whereby with the split ring fixed within the opening at the top ends of the strips at the support shoulders thereof, the split ring is pressed about the lower peripheral of the sink drain fitting, flexing each strip outwardly as the split ring expands around the lower peripheral of the sink drain fitting until it snaps into the ring groove of the sink drain fitting.

6. The alignment tool of claim 5 wherein the threaded shaft includes a thread with at least six starts.

7. The alignment tool of claim 5 wherein the threaded shaft includes a thread with eight starts.

8. The alignment tool of claim 5 wherein the second portion includes a plurality of handle grip extensions extending radially outwardly from the segment for facilitating rotation of the segment on the threaded shaft.

9. The alignment tool of claim 5 further including a garbage disposal stand having a base adapted for resting on a support surface below the sink fitting and a manually-actuable knob, the mount platform having a substantially flat top side, the manually-actuable knob engaging the second end of the threaded shaft to raise or lower the shaft and mount platform with respect to the base, whereby the stand can be positioned below a garbage disposal, the mount platform raised to support the garbage disposal on the flat top side thereof in place at the sink drain fitting.

* * * * *